US007222035B1

United States Patent
Zhodzishsky et al.

(10) Patent No.: US 7,222,035 B1
(45) Date of Patent: May 22, 2007

(54) METHOD AND APPARATUS FOR DETERMINING CHANGING SIGNAL FREQUENCY

(75) Inventors: Mark I. Zhodzishsky, Moscow (RU);
Sergey Yudanov, Moscow (RU);
Victor A. Prasolov, Moscow (RU);
Victor A. Veitsel, Moscow (RU)

(73) Assignee: Topcon GPS, LLC, Paramus, NJ (US)

( * ) Notice: Subject to any disclaimer, the term of this patent is extended or adjusted under 35 U.S.C. 154(b) by 142 days.

(21) Appl. No.: 10/990,605

(22) Filed: Nov. 17, 2004

(51) Int. Cl.
*G06F 19/00* (2006.01)
(52) U.S. Cl. .......................... 702/75; 702/69; 702/125; 702/176; 702/149; 324/76.44; 324/76.29; 324/76.17; 386/50
(58) Field of Classification Search ................ 702/75, 702/125, 176, 177, 149, 69; 324/76.44, 76.39, 324/76.52, 76.29, 76.53, 76.17; 386/50
See application file for complete search history.

(56) References Cited

U.S. PATENT DOCUMENTS

| 4,774,480 | A | * | 9/1988 | Sato et al. ................... 331/1 A |
| 5,055,801 | A | * | 10/1991 | Koga et al. ................... 331/14 |
| 5,146,290 | A | | 9/1992 | Hartrumpf |
| 5,471,218 | A | | 11/1995 | Talbot et al. |
| 6,268,824 | B1 | | 7/2001 | Zhodzishky et al. |
| 6,594,330 | B1 | * | 7/2003 | Wilson ........................ 375/376 |
| 6,993,445 | B2 | * | 1/2006 | Clarke et al. ................ 702/106 |
| 2002/0057426 | A1 | | 5/2002 | Ohtomo et al. |
| 2002/0060788 | A1 | | 5/2002 | Ohtomo et al. |
| 2002/0092978 | A1 | | 7/2002 | Ohtomo et al. |
| 2003/0128643 | A1 | * | 7/2003 | Honma et al. ............ 369/53.34 |
| 2003/0136901 | A1 | | 7/2003 | Ohtomo et al. |
| 2003/0137658 | A1 | | 7/2003 | Ohtomo et al. |
| 2004/0120387 | A1 | * | 6/2004 | Bultan et al. ................ 375/149 |

OTHER PUBLICATIONS

Elkateb et al., 'New Technique for adaptive-frequency load shedding suitable for industry with private generation', Sep. 1993, IEEE Publication, vol. 140, No. 5, pp. 411-420.*
U.S. Appl. No. 10/732,145, Ohtomo et al.
Goad, C., Surveying with the Global Positioning System, Ch. 18 pp. 501-517, pub. in "Global Positioning System: Theory & App." vol. 2, AIAA, Inc. Washington, DC. Jan. 15, 1996.

* cited by examiner

*Primary Examiner*—Marc S. Hoff
*Assistant Examiner*—Elias Desta
(74) *Attorney, Agent, or Firm*—Law Office of Jeffrey M. Weinick, LLC

(57) ABSTRACT

A method and apparatus for estimating the changing frequency of a signal received by a satellite receiver from, illustratively, positioning system satellites is disclosed that enables a more accurate measurement of the change in frequency of that signal due to movement of the satellite receiver relative to those satellites. The system includes a PLL having a numerically controlled oscillator (NCO) and a filter of frequency estimates (FFE). In operation, an analog signal is received at the satellite receiver and the PLL tracks the changing signal frequency and outputs non-smoothed frequency estimates into the FFE. The FFE then smoothes noise in the signal to produce a more accurate smoothed frequency estimate of the input signal. Comparing multiple estimates over time allows Doppler shift of the signal frequency received by the satellite receiver to be calculated more precisely, thus resulting in more accurate satellite receiver velocity vector determinations and, hence, position measurements.

23 Claims, 3 Drawing Sheets

METHOD AND APPARATUS FOR DETERMINING CHANGING SIGNAL FREQUENCY

BACKGROUND OF THE INVENTION

This invention relates generally to satellite navigation receivers and more particularly to interference mitigation in a satellite navigation receiver.

Satellite navigation systems, such as GPS (USA) and GLONASS (Russia), are well known in the art and are intended for highly accurate self-positioning of users possessing special navigation receivers. A navigation receiver receives and processes radio signals transmitted by satellites located within line-of-sight distance of the receivers. The satellite signals comprise carrier signals that are modulated by pseudo-random binary codes. The receiver measures the time delay of the received signal relative to a local reference clock or oscillator. These measurements enable the receiver to determine the so-called pseudo-ranges between the receiver and the satellites. The pseudo-ranges are different from the ranges (distances) between the receiver and the satellites due to various noise sources and variations in the time scales of the satellites and receiver. If the number of satellites is large enough, then the measured pseudo-ranges can be processed to determine the user location and coordinate time scales.

The requirement of accurately determining user location with a high degree of precision, and the desire to improve the stability and reliability of measurements, have led to the development of differential navigation (DN). In differential navigation, the task of finding the user position, also called the Rover, is performed relative to a Base station (Base). The precise coordinates of the Base station are known and the Base station is generally stationary during measurements. Since the position of the satellites is also known, the range of the Base to each of the satellites can be determined by comparing the position of the Base with the position of each of the satellites. The Base station also has a navigation receiver which receives and processes the signals of the satellites to generate pseudo-range measurements, as discussed above, from the Base to each satellite. The Base then compares these measurements with the expected range to each of the satellites. Any difference between the pseudo-range calculated measurements and the expected range to the satellites represents an error in the pseudo-range calculations. For relatively short distances between the Rover and the Base (e.g., less than 20 km), these range errors are strongly correlated (e.g., are essentially the same for both the Rover and the Base). Therefore, by transmitting the pseudo-range error measurements made at the Base to the Rover (e.g., via wireless communication channel), the pseudo-range of each of the satellites to the Rover, as calculated at the Rover, can be also be more accurately determined based on the errors calculated at the Base. Accordingly, the location determination is improved in the differential navigation mode because the Rover is able to use the Base station pseudo-range error measurements in order to compensate for the major part of the errors in the Rover measurements.

Various modes of operation are possible while using differential navigation. In post-processing (PP) mode, the Rover's coordinates are determined by co-processing the Base and Rover measurements after all measurements have been completed. This allows for highly accurate location determination, albeit not in real-time, because more data is available for the location determination. In real-time processing (RTP) mode, the Rover's coordinates are determined in real time upon receipt of the Base station information received via the communication channel.

The location determination accuracy of differential navigation may be further improved by supplementing the pseudo-range measurements with measurements of the phases of the satellite carrier signals. If the carrier phase of the signal received from a satellite in the Base receiver is measured and compared to the carrier phase of the same satellite measured in the Rover receiver, measurement accuracy may be obtained to within several percent of the carrier's wavelength. The practical implementation of those advantages, which might otherwise be guaranteed by the measurement of the carrier phases, runs into the problem of ambiguity resolution for phase measurements.

The ambiguities are caused by two factors. First, the difference of distances from any satellite to the Base and Rover is usually much greater than the carrier's wavelength. Therefore, the difference in the phase delays of a carrier signal received by the Base and Rover receivers may substantially exceed one cycle. Second, it is not possible to measure the integer number of cycles from the incoming satellite signals; one can only measure the fractional part. Therefore, it is necessary to determine the integer number of cycles, which is called the "ambiguity". More precisely, we need to determine the set of all such integer parts for all the satellites being tracked, one integer part for each satellite. One has to determine this set along with other unknown values, which include the Rover's coordinates and the variations in the time scales.

At a high level, the task of generating highly-accurate navigation measurements is formulated as follows: it is necessary to determine the state vector of a system, with the vector containing $n_\Sigma$ unknown components. Those include three Rover coordinates (usually along Cartesian axes X, Y, Z) in a given coordinate system (sometimes time derivatives of coordinates are added too); the variations of the time scales which is caused by the phase drift of the local main reference oscillator in the receiver; and n integer unknown values associated with the ambiguities of the phase measurements of the carrier frequencies. The value of n is determined by the number of different carrier signals being processed, and accordingly coincides with the number of satellite channels actively functioning in the receiver. At least one satellite channel is used for each satellite whose broadcast signals are being received and processed by the receiver. Some satellites broadcast more than one code-modulated carrier signal, such as a GPS satellite which broadcasts a carrier in the $L_1$ frequency band and a carrier in the $L_2$ frequency band. If the receiver processes the carrier signals in both of the $L_1$ and $L_2$ bands, a so-called dual-frequency receiver, the number of satellite channels (n) increases correspondingly. Dual-frequency receivers allow for ionosphere delay correction therefore making ambiguity resolution easier.

Two sets of navigation parameters are measured by the Base and Rover receivers, respectively, and are used to determine the unknown state vector. Each set of parameters includes the pseudo-range of each satellite to the receiver, and the full (complete) phase of each satellite carrier signal. Each pseudo-range is obtained by measuring the time delay of a code modulation signal of the corresponding satellite. The code modulation signal is tracked by a delay-lock loop (DLL) circuit in each satellite tracking channel. The full phase of a satellite's carrier signal is tracked by a phase-lock-loop (PLL) in the corresponding satellite tracking channel. An observation vector is generated as the collection of the measured navigation parameters for specific (definite) moments of time.

The relationship between the state vector and the observation vector is defined by a well-known system of navigation equations. Given an observation vector, the system of equations may be solved to find the state vector if the number of equations equals or exceeds the number of unknowns in the state vector. Conventional statistical methods are used to solve the system of equations: the least squares method, the method of dynamic Kalman filtering, and various modifications of these methods. Practical implementations of these methods in digital form may vary widely. In implementing or developing such a method on a processor, one usually must find a compromise between the accuracy of the results and speed of obtaining results for a given amount of processor capability, while not exceeding a certain amount of loading on the processor.

Most DN receivers not only provide the Rover's coordinates, but also provide a derived vector of velocity of the Rover's movement. A simple method of determining velocity is to measure the amount of time taken to travel a given distance (e.g., between successive location determinations). However, this typically results in a relatively inaccurate estimate of the Rover's velocity. Hence, other methods have been developed. In a first method, the velocity of the Rover is estimated by measuring the Doppler shift in the frequency of the signal received from each satellite to obtain the radial velocity of the Rover relative to each satellite. The radial velocity is then converted to a coordinate velocity of the Rover. To reduce random errors in these velocity measurements, various well-known methods of time smoothing the estimated frequencies are used. One method of determining the radial velocity of a Rover is based on measuring the full-phase incursion in the aforementioned PLL during a preset/measured time interval. The radial velocity of the Rover relative to each satellite is determined by dividing the phase incursion by the time interval and then multiplying the result by the carrier wavelength. Performing this calculation for each of the satellites produces a set of radial velocities of the Rover relative to each of the satellites. Further processing using, for example, the least-squares method produces the Rover's coordinate velocity from this set of radial velocities.

One of the major sources of error in calculating velocity vectors of a Rover using satellite navigation receivers is that satellite signals are difficult to detect in certain circumstances. This is because typical Rovers in DGPS systems operate in various noisy signal environments. Tracking systems operating at such noisy signals often have difficulty producing relatively fine Doppler shift measurements.

Various techniques have been employed to reduce the effect of such interference on measuring Doppler shift of the carrier phase. These techniques have generally relied on the fact that the frequency change over the measured time interval is essentially linear. Thus, by measuring multiple values of the full phase over the measured time interval, it is possible to determine the estimate of the initial phase and its first and second derivatives. These derivatives can be used to fit the received frequency shift measurements to the expected linear relationship.

In another attempt (described in Szames et al, DGPS High Accuracy Aircraft Velocity Determination Using Doppler Measurements, Proceedings of the International Symposium on Kinematic Systems (KIS), Banff, AB, Canada, June 306, 1997), raw Doppler shift derived measurements of velocity are processed using curve-fitting techniques to obtain velocity estimates as good as those using the first order central difference approximation of the carrier phase, without the extra step of determining the first and second order derivatives.

SUMMARY OF THE INVENTION

The present inventors have invented a digital system and method for estimating the changing frequency of a signal received by a satellite receiver from, illustratively, positioning system satellites, in order to more accurately measure the change in frequency of that signal due to movement of the receiver relative to those satellites. The system comprises a PLL having a numerically controlled oscillator (NCO) and a filter of frequency estimates (FFE). An analog signal is received at the satellite receiver and the PLL tracks the changing signal frequency and outputs non-smoothed frequency estimates into the FFE. The FFE then smoothes noise in the signal to produce a more accurate smoothed frequency estimate of the input signal. Comparing multiple estimates over time allows Doppler shift of the signal frequency received by the satellite receiver to be calculated more precisely, thus resulting in more accurate satellite receiver velocity vector determinations and, hence, position measurements.

DETAILED DESCRIPTION OF THE INVENTION

Figure 1:
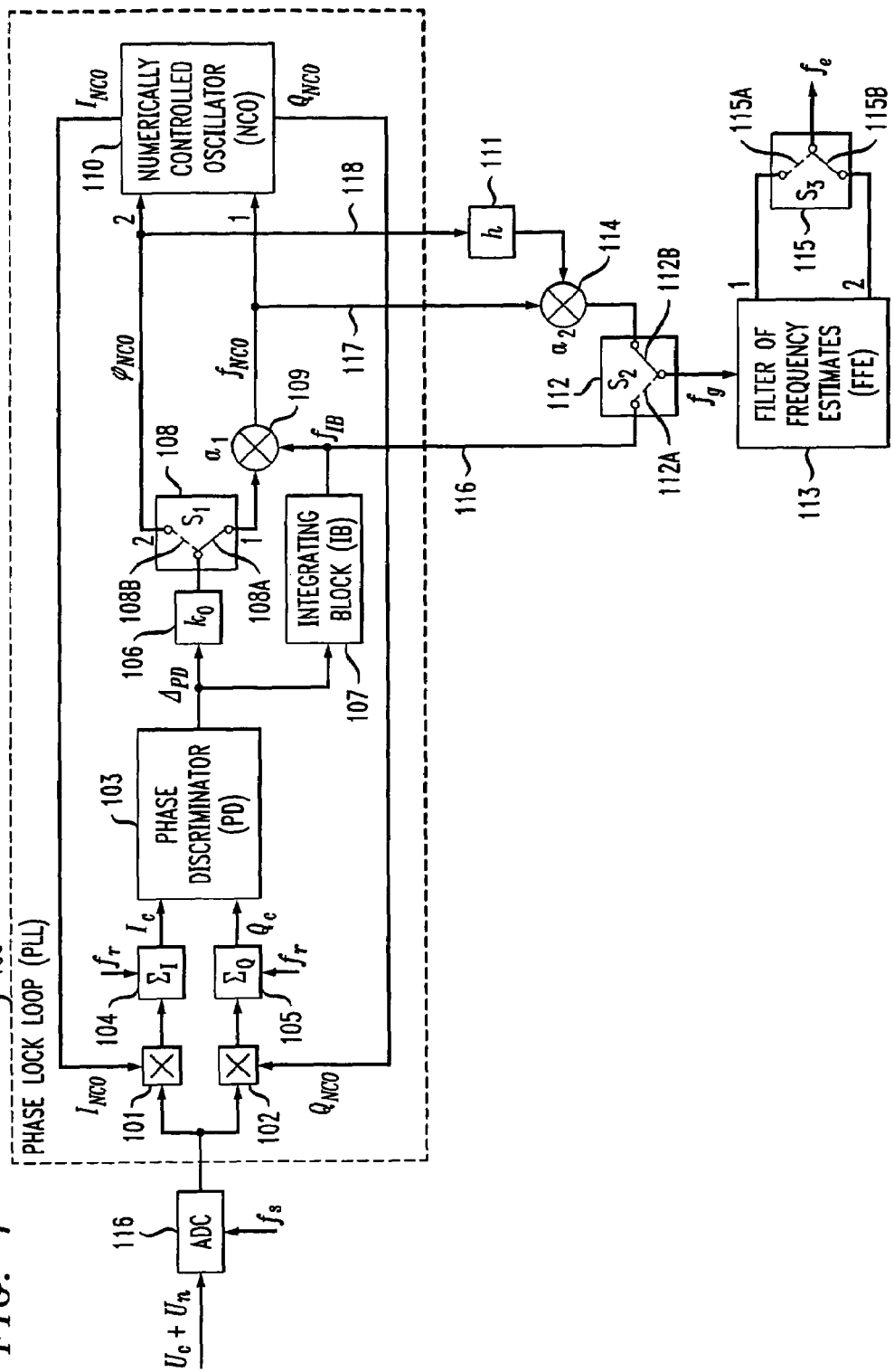
FIG. 1 shows an illustrative PLL coupled to an FFE in accordance with the principles of the present invention.

FIG. 1 shows a function diagram of an illustrative radio receiver, such as a receiver in a GPS system, in accordance with the principles of the present invention. Referring to that figure, illustrative analog to digital converter (ADC) 116 is connected to PLL 100 which is, in turn connected to Filter of Frequency Estimates (FFE) 113. PLL 100 is similar to typical PLLs in that PLL 100 has a digital phase discriminator (PD) 103, a numerically controlled oscillator (NCO) 110 and a loop filter consisting of integrating block (IB) 107 and instantaneous element 106 having constant transfer coefficient $k_0$.

In operation, an analog signal, such as a signal from a positioning system satellite, is received at a satellite receiver having PLL 100 and is input to ADC 116 where it is converted into a digital signal. Illustratively, the input analog signal is characterized by the equation:

$$U_C = A \cos(\int 2\pi f_c(t) dt) \quad \text{(Equation 1)}$$

where $U_c$ is the signal, A is the amplitude of the signal, $f_c(t)$ is the frequency of the signal, which, illustratively, changes over time due to Doppler shift of the signal due to the relative motion of the signal source and the receiver. One skilled in the art will recognize that typical signals received by a receiver may contain a noise component due to, illustratively, additive thermal Gaussian noise. This noise component, also referred to herein as $U_N$ typically either constructively or destructively interferes with the signal as it is input into the ADC. Thus, the combined $U_C+U_N$ signal is transformed by the ADC into a digital signal with illustrative discretization frequency $f_s$. Digital quadrature samples $I_{NCO}$ and $Q_{NCO}$ output from the NCO are multiplied by signal samples at the ADC output by multipliers 101 and 102 and are then input into digital low pass filters. Here, illustratively, the low-pass filters are represented by accumulators 104 and 105. Accumulators 104 and 105 have, illustratively, a reset rate $f_r$ (the rate at which the PLL operates) defined as:

$$f_r = f_s/n_r \qquad \text{(Equation 2)}$$

where $f_s$ is the discretization (sampling) frequency discussed above and $n_r$ is an integer. This integer $n_r$ is illustratively chosen to reduce the PLL reset rate $f_r$ (also referred to herein as the PLL control rate), while at the same time maintaining $f_r$ at a level higher than the PLL bandwidth. Reducing the reset frequency $f_r$ is desirable because such a low frequency functions to reduce the frequency of operating circuits and/or digital signal processor loading. However, frequency $f_r$ is the frequency at which the PLL will iteratively operate to maintain phase lock on a signal. If a PLL operates any lower than its bandwidth capability, it will not maintain lock on the phase of the signal as accurately as it otherwise would. Therefore, it is desirable to maintain the reset frequency $f_r$ significantly above the bandwidth of the PLL. Therefore, integer $n_r$ may illustratively be selected at the lowest value possible to maintain f, at a desired level over the bandwidth of the PLL.

Accumulators 104 and 105 output quadrature samples $I_c$ and $Q_c$ and provide those signals to the digital phase discriminator 103. The phase discriminator 103 then generates a phase difference signal $\Delta_{PD}$, which is a function of the phase difference between the phase of said signal and the phase of a reference signal generated by an oscillator (NCO), illustratively where $\Delta_{PD}=\text{arctg}(Q_c/I_c)$. This signal $\Delta_{pp}$ is then input both into the instantaneous element 106 which has a constant transfer coefficient $k_0$, as well as into the integrating block (IB) 107.

Figure 2A:
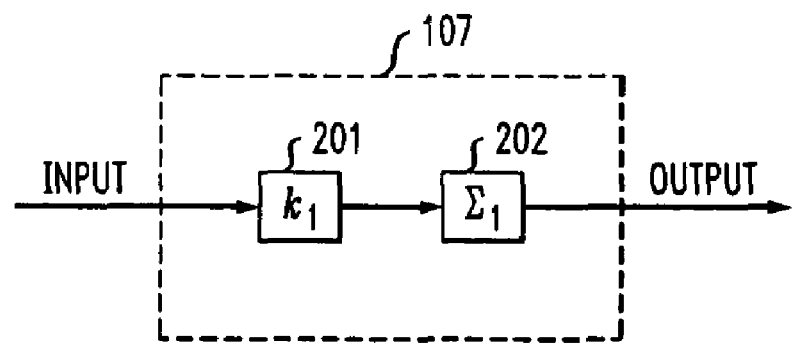
FIG. 2a shows one variation of an integrating block useful in the PLL of FIG. 1.
Figure 2B:
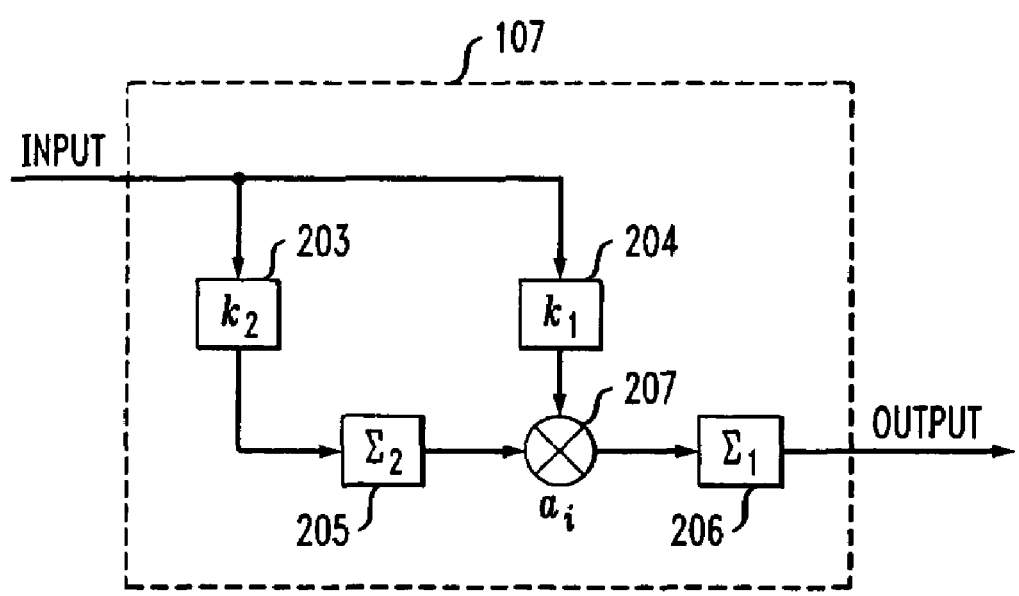
FIG. 2b shows another variation of an integrating block useful in the PLL of FIG. 1.

Different implementations of IB 107 are possible. For example, FIG. 2A shows a first illustrative embodiment of IB 107 having a single instantaneous element 201 having transfer coefficient $k_1$ and a single accumulator 202. One skilled in the art will recognize that such an implementation will ensure a second order of astaticism. FIG. 2B shows a second illustrative embodiment of IB 107 having, for example, instantaneous elements 203 and 204, accumulators 205 and 206; and adder 207. The incoming signal in IB 107 of FIG. 2B is input into instantaneous elements 203 and 204 having transfer coefficients $k_2$ and $k_1$, respectively. The resulting signal from instantaneous element 203 is then input into accumulator 205 and is then input into adder 207, where it is added with the signal output from instantaneous element 204. This added signal is then processed by accumulator 206 before being output from the integrating block. One skilled in the art will recognize that the output from the integrating block of FIG. 2B will guarantee that the PLL has a third order of astaticism due to the two accumulators 205 and 206.

Referring once again to FIG. 1, switch 108 has, illustratively, two possible positions, referenced in FIG. 1 as position 108A and position 108B. In FIG. 1, switch 108 is illustratively shown in a first position 108A which leads to the NCO being controlled only by frequency. In this mode, IB 107 functions to convert the phase difference $\Delta_{PD}$ generated by PD 103 into a frequency estimate $f_{IB}$ of the incoming signal $U_C$. This estimate is then added by adder 109 to the transfer coefficient-adjusted $\Delta_{PD}$ in order to generate an adjusted frequency. This adjusted frequency, $f_{NCO}$, is then used to adjust the frequency of the NCO over the current control interval of the PLL in accordance with the equation:

$$F_{NCO}^{i+1}=\Delta F_{NCO}*f_{NCO}^{i+1} \qquad \text{(Equation 3)}$$

where i is the number of the control interval, $\Delta F_{NCO}$ is the increment of NCO frequency, or the change of NCO frequency at changing $f_{NCO}$ by unit The time span of the current control interval is determined by the equation $$T_r = n_r/f_s \qquad \text{(Equation 4)}$$

where, as before, $n_r$ is an integer and $f_s$ is the discretization frequency used to sample the incoming analog signal and convert it into a digital signal. In this manner, frequency synchronization is maintained between the PLL and the incoming signal $U_C$.

Switch 108 can also illustratively be set to position 108B. In this position, the estimated phase $\phi_{NCO}$, obtained from the $\Delta_{PD}$ generated by PD 103, is used separately as an input to the NCO along with the frequency $F_{IB}$ without adding. NCO uses this $\phi_{NCO}$ signal to control the phase $\Phi_{NCO}$ of the NCO 110 according to the equation:

$$\Phi_{NCO}^{i+1}=\Phi_{NCO}^i+\Delta\Phi_{NCO}*\phi_{NCO}^i \qquad \text{(Equation 5)}$$

where I is the number of the control interval, $\Delta\Phi_{NCO}$ is the NCO phase increment or, in other words, the change of the NCO phase at changing $\phi_{NCO}^i$ by unit. Thus, when switch 108 is in position 108B, NCO 110 receives both a phase signal and a frequency signal separately and uses them to generate $\Phi_{NCO}$ and $F_{NCO}$ of the control signal represented by the $I_{NCO}$ and $Q_{NCO}$ components output from NCO 110.

While the above-described PLL 100 is sufficient to maintain frequency and phase synchronization with an incoming signal, the accuracy of this synchronization may not be sufficient for certain applications. For example, as discussed above, extremely fine frequency and phase synchronization is required to accurately detect the motion vector, and hence the precise position, of a Rover receiver in a differential GPS system. Simply using the PLL as described above may be insufficient to achieve this degree of accuracy. As a result, it is desirable to further process, or smooth, the frequency estimates in order to obtain a more accurate synchronization with the incoming analog signal and, accordingly, generate a better estimate of the received frequency. This in turn will enable a more precise location measurement based on the Doppler shift of the received frequency over a discrete time difference.

This enhanced accuracy is achieved in accordance with the principles of the present invention by using a filter of frequency estimates (FFE) 113 to produce a smoothed frequency estimate $f_e$ of the frequency $f_C$ of signal $U_C$. Once again, referring to FIG. 1, FFE 113 has an input switch 112 that has 2 positions, position 112A and position 112B. If switch 108 is in position 108A (corresponding to frequency control of the PLL, then the position of switch 112 will determine whether the frequency $f_{IB}$ is selected (position 112A) or the frequency $f_{NCO}$ (position 112B) is selected as an input into the FFE 113. Alternatively, if switch 108 is in position 108B (corresponding to frequency/phase control of the PLL), then there also exists two possible inputs into the FFE 113. Once again, if switch 112 is in position 112A, then the input into FFE 113 will be the frequency $f_{IB}$ output by IB 107. If, on the other hand, switch 112 is set in position 112B, then the adder sums the $f_{NCO}$ signal with the added signal output from adder 114, which is the sum of two separate signals. The first signal input into adder 114 is the frequency $f_{NCO}=f_{IB}$ traveling to adder 114 along path 117. The second signal input into adder 114 is the phase $\phi_{NCO}$ multiplied by constant coefficient h in instantaneous element 111. The added signal output from adder 114 is a frequency $f_{PFC}$ defined by the equation:

$$f_{PFC}=f_{NCO}+h*\phi_{NCO} \quad \text{(Equation 6)}$$

where constant coefficient h is defined by the equation:

$$h = \frac{\Delta\Phi_{NCO}}{2\pi * T_r * \Delta F_{NCO}} \quad \text{(Equation 7)}$$

where the variables are defined as was discussed previously in association with the discussion of Equations 3, 4 and 5. The result of any of the aforementioned combinations of settings for switches 108 and 112 are that an unsmoothed estimated frequency $f_g$, which is an estimate of the input signal $U_C$ frequency $f_C$, is input into the FFE 113.

Figure 3A:
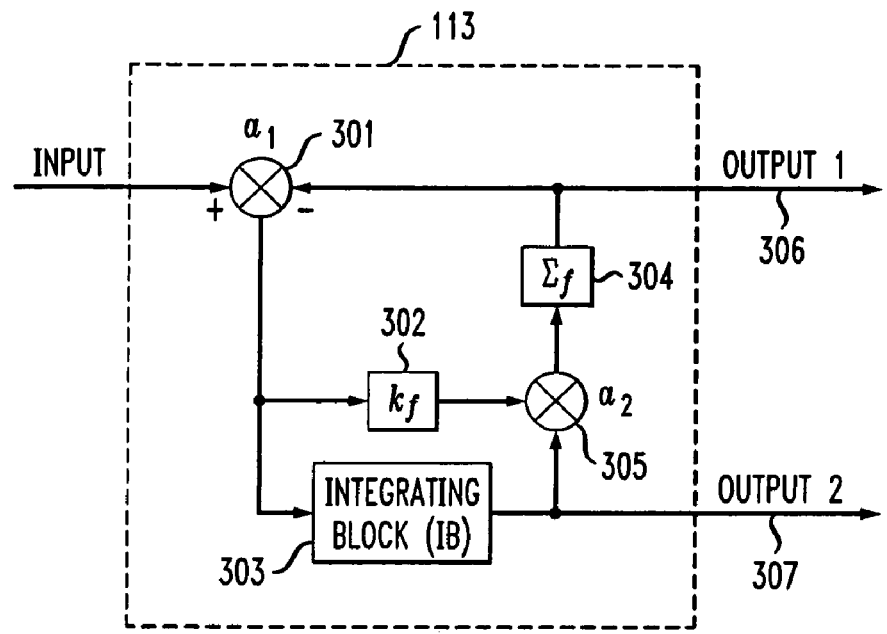
FIG. 3a shows one variation of an FFE that may be used in conjunction with a PLL as illustrated in FIG. 1.
Figure 3B:
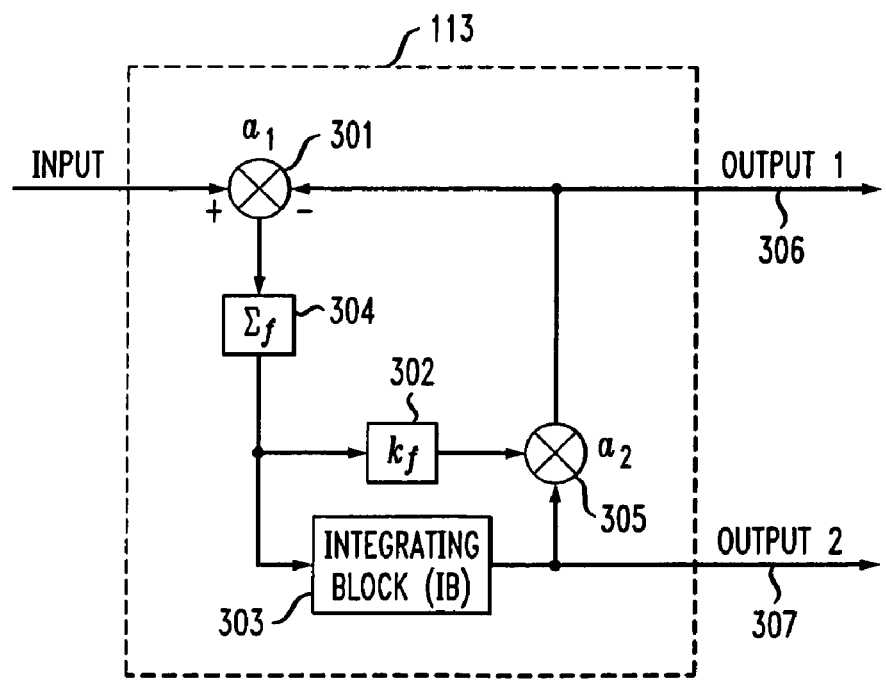
FIG. 3b shows another variation of an FFE that may be used in conjunction with a PLL as illustrated in FIG. 1.

FIGS. 3A and 3B show two different illustrative embodiments of FFE 113 in accordance with the principles of the present invention. The FFEs of both figures each have a difference element 301 (which operates as a discriminator), an accumulator 304, an instantaneous element 302 with transfer coefficient $k_f$, an adder 305 and an integrating block 303. Both FFEs each have two outputs, 306 and 307, respectively. The difference between the FFEs of FIGS. 3A and 3B is the position of accumulator 304 in the circuit relative to other circuit components. In the first illustrative embodiment of FFE 113, shown in FIG. 3A, the output of difference element 301 is input into the instantaneous element 302 as well as IB 303. The output of instantaneous element 302 is the first input signal to adder 305. The output of IB 303 is the second input into adder 305. The output of IB 303 is also directed to FFE output 307. The output of adder 305 is input, in turn, into accumulator 304. The output of accumulator 304 is then fed back to adder 301 as well as to FFE output 306. Thus, for example, with the FFE of FIG. 3A having IB 107 of FIG. 2A, the signal flow following the input of unsmoothed estimated frequency $f_g$ can be described as a set of numbers at the input and/or output of the various components of the FFE 113. Unsmoothed frequency $f_g$, for example, is input into FFE 113, and can be represented as input number $N_{input}^i$ input into FFE 113. Thus, the signal flow between the components of the FFE of FIG. 3A can be defined as:

$$N_{a_1}^{i+1}=N_{input}^i-N_{\Sigma_f}^i \quad \text{(Equation 8A)}$$

$$N_{\Sigma_1}^{i+1}=N_{\Sigma_1}^i+k_1*N_{a_1}^{i+1} \quad \text{(Equation 8B)}$$

$$N_{IB}^{i+1}=N_{\Sigma_1}^{i+1} \quad \text{(Equation 8C)}$$

$$N_{\Sigma_f}^{i+1}=N_{\Sigma_f}^i+k_f*N_{a_1}^i+N_{IB}^{i+1} \quad \text{(Equation 8D)}$$

where i is the number of the control interval, $N_{a_1}^1$ is the number at the output of element $a_1$ 301; $N_{\Sigma_f}^i$ is the number at the output of element $\Sigma_f$ 304; $N_{IB}^i$ is the number at the output of element IB 303; $N_{\Sigma_1}^i$ is the number at the output of element $\Sigma_1$ 202. If the IB of FIG. 2B is used in place of the IB of FIG. 2A, then equation 8B becomes:

$$N_{\Sigma_1}^{i+1}=N_{\Sigma_1}^i+N_{\Sigma_2}^{i+1}+k_1*N_{a_1}^{i+1} \quad \text{(Equation 9A)}$$

where:

$$N_{\Sigma_2}^{i+1}=N_{\Sigma_2}^i+k_2*N_{a_1}^{i+1} \quad \text{(Equation 9B)}$$

where $N_{\Sigma_2}^i$ is the number at the output of element $\Sigma_2$ 205. One skilled in the art will recognize that Equation 8C above describes the smoothed frequency estimate signal, also referred to herein as smoothed frequency, $f_e$, that is output at FFE output 307 in FIG. 3A. Similarly, Equation 8D describes the smoothed frequency, $f_e$, that is output at FFE output 306 in FIG. 3A.

FIG. 3B shows a second embodiment of an FFE 113. In that figure, all components are arranged the same as in FIG. 3A with the exception that the input of the accumulator 304 is the output of difference element 301 and that the output of the accumulator is fed into both the IB 303 as well as the instantaneous element 302. Likewise, since the accumulator 304 has been moved to a different position in the circuit, the output of adder 305 is now directly fed into both difference element 301 as well as FFE output 306. Therefore, for the FFE embodiment of FIG. 3B and IB 107 of FIG. 2A, the following equations describe the signal flow among the components in FIG. 3B:

$$N_{a_1}^{i+1}=N_{input}^i-(k_f*N_{\Sigma_f}^i+N_{IB}^i) \quad \text{(Equation 10A)}$$

$$N_{\Sigma_f}^{i+1}=N_{\Sigma_f}^i+N_{a_1}^{i+1} \quad \text{(Equation 10B)}$$

$$N_{\Sigma_i}^{i+1}=N_{\Sigma_i}^i+k_1*N_{\Sigma_f}^{i+1} \quad \text{(Equation 10C)}$$

$$N_{IB}^{i+1}=N_{\Sigma_i}^{i+1} \quad \text{(Equation 10D)}$$

where the elements of equations 10A–10D are as described above. As before, one skilled in the art will recognize that Equation 10D above describes the smoothed frequency estimate signal, also referred to herein as smoothed frequency, $f_e$, that is output at FFE output 307 in FIG. 3B. Similarly, the number $N_{a_2}^i$ at the output of element $a_2$, which is equal to $N_{a_2}^i=k_f*N\Sigma_f^i N_{IB}^i$, describes the smoothed frequency, $f_e$, that is output at FFE output 306 in FIG. 3B. Once again, if the IB of FIG. 2B is used in the FFE of FIG. 3B, equation 10C then becomes:

$$N_{\Sigma_i}^{i+1}=N_{\Sigma_i}^i+N_{\Sigma_2}^{i+1}+k_1*N_{\Sigma_f}^{i+1} \quad \text{(Equation 11A)}$$

where:

$$N_{\Sigma_2}^{i+1}=N_{\Sigma_2}^i+k_2*N_{\Sigma_f}^{i+1} \quad \text{(Equation 11B)}$$

Thus, in both illustrative FFEs of FIGS. 3A and 3B, respectively, an unsmoothed frequency estimate $f_g$ of the input frequency $f_C$ is input into the FFE and a smoothed frequency estimate $f_e$ can be obtained from FFE output 306 or FFE output 307. Whichever output is selected, the smoothed coded frequency estimate $f_e$ can provide an actual frequency value $F_e$ in hertz units according to the equation:

$$F_e[Hz]=f_e*\Delta F_{NCO} \quad \text{(Equation 12)}$$

One skilled in the art will recognize that, in either the embodiment of FIG. 3A or the embodiment of FIG. 3B, if output 306 is selected, the smoothed frequency estimate $f_e$ will be the same. Referring once again to FIG. 1, a switch 115 may be added in a way such that, if position 115A is selected, the output 306 of FFE 113 in FIG. 3 may be sampled and if position 115B is selected, the output 307 of FFE 113 in FIG. 3 may be sampled.

One skilled in the art will also recognize that, as discussed above, in addition to the different positions of switch 115, a number of different settings are possible for the PLL/FFE combinations shown in FIGS. 1, 2 and 3. Specifically switches 108 and 112 (as well as switch 115) each have two separate settings FFE 113 may have two optional configurations, as represented by FIGS. 3A and 3B, respectively. Additionally, IB 107 and IB 303 may also be either the configuration shown in FIG. 2A or the configuration shown in FIG. 2B. Accordingly, there are illustratively a total of 32 different configurations of the PLL/FFE/IB arrangement embodied in FIG. 1. The choice of configuration of PLL/FFE/IB arrangement may be made based on the intended implementation of the arrangement taking into account the simplicity and ease of implementation. Whichever configuration is chosen, the result of coupling FFE 113 with PLL 100 is that a refined, smoothed frequency estimate of the input signal $U_c$ in FIG. 1 may be obtained. These refined frequency estimates may then be used to determine the Doppler frequency shift of a signal received by that receiver to generate the velocity vector of the receiver. This may illustratively be used to more accurately determine the position of the receiver as compared to receivers using only a PLL to track the frequency and phase of an incoming signal.

One skilled in the art will recognize that the various embodiments described herein may take different forms. For example, the embodiments described above may be implemented in both hardware and/or firmware. Additionally, switches 108, 112 and 115 are illustrative in nature and are merely included to show the various possible embodiments described herein. One skilled in the art will recognize in light of the foregoing that a particular implementation may be chosen and these switches may be eliminated from the circuitry as implemented. Finally, while the above description describes the illustrative embodiment where Differential GPS (DGPS) is used, one skilled in the art will also understand that the foregoing may be used in modes where the Rover operates in a stand-alone mode and does not use the signals from the Base.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of estimating the frequency of a signal, said method comprising:
   receiving an analog signal characterized in part by a frequency;
   generating in a phase locked loop a non-smoothed estimate of said frequency;
   providing said non-smoothed estimate of said frequency to a filter of frequency estimates comprising a plurality of reactive elements; and
   generating from said filter of frequency estimates a smoothed estimate of said frequency.

2. The method of claim 1 wherein the step of generating in a phase locked loop comprises:
   converting an analog signal into a digital signal;
   providing said digital signal to a phase discriminator;
   generating a phase difference signal which is a function of a phase difference between the phase of said digital signal and the phase of a reference signal generated by an oscillator;
   providing said phase difference signal to an first instantaneous element having a first constant transfer coefficient; and
   providing said phase difference signal to a first integrating block.

3. The method of claim 2 wherein said first integrating block comprises a second instantaneous element having a second constant transfer coefficient, said method further comprising:
   providing said phase difference signal to said second instantaneous element; and
   providing an output of said second instantaneous element to said accumulator,
   wherein the output of said accumulator comprises the output of said first integrating block.

4. The method of claim 2 wherein said integrating block comprises a second instantaneous element having a second constant transfer coefficient, a third instantaneous element having a third constant transfer coefficient, a first accumulator, a second accumulator and an adder, both of said instantaneous elements comprising constant transfer coefficients, said method further comprising:
   providing said phase difference signal into said second instantaneous element;
   providing said phase difference signal into said third instantaneous element;
   providing the output of said third instantaneous element into said second accumulator;
   providing the output of said second accumulator into said adder;
   providing the output of said second instantaneous element into said adder;
   adding the output of said second instantaneous element and the output of said second accumulator; and
   providing the output of said adder into said first accumulator,
   wherein the output of said first accumulator comprises the output of said integrating block.

5. The method of claim 2 further comprising:
   adding the output of said first instantaneous element to the output of said
   first integrating block to generate an added signal; and
   providing said added signal into said oscillator.

6. The method of claim 2 further comprising:
   providing into said oscillator a frequency signal generated by said integrating block; and
   providing into said oscillator a phase signal generated by said first instantaneous element.

7. The method of claim 5 wherein the said added signal comprises an unsmoothed input signal frequency estimate.

8. The method of claim 5 wherein the output of said first integrating block comprises an unsmoothed input signal frequency estimate.

9. The method of claim 6 wherein said frequency signal comprises an unsmoothed input signal frequency estimate.

10. The method of claim 6 further comprising:
    multiplying said phase signal $\phi_{NCO}$ by a coefficient h, $\phi_{NCO}$ is an estimated phase obtained from the phase difference generated by said phase discriminator;
    said coefficient h defined by the equation:

$$h = \frac{\Delta \Phi_{NCO}}{2\pi * T_r * \Delta F_{NCO}}$$

wherein $\Delta\Phi_{NCO}$ is the change over discrete time $T_r$ of a phase of said oscillator; $\phi_{NCO}$ is an estimated phase obtained from the phase difference generated by said phase discriminator; and $\Delta F_{NCO}$ is the change over discrete time $T_r$ of the frequency of said oscillator; and adding said frequency signal to said phase signal to generate an unsmoothed input signal frequency estimate.

11. The method of claim 1, further comprises:

providing a non-smoothed estimate of said frequency into a difference element of said filter of frequency estimates.

12. The method of claim 11 further comprising:

providing the output of said difference element into an instantaneous element;

providing the output of said difference element into an integrating block;

providing the output of said instantaneous element and the output of said integrating block into an adder;

providing the output of said adder into an accumulator; and providing the output of said accumulator into said difference element.

13. The method of claim 12 wherein the output of said accumulator comprises a first output of said filter of frequency estimates.

14. The method of claim 12 wherein the output of said integrating block comprises a second output of said filter of frequency estimates.

15. The method of claim 11 further comprising:

providing the output of said difference element into an accumulator;

providing the output of said accumulator into an integrating block;

providing the output of said accumulator into an instantaneous element;

providing the output of said instantaneous element and the output of said integrating block into an adder; and providing the output of said adder into said difference element.

16. The method of claim 15 wherein the output of said adder comprises a first output of said filter of frequency estimates.

17. The method of claim 15 wherein the output of said integrating block comprises a second output of said filter of frequency estimates.

18. Apparatus for use in producing a smoothed estimate of the frequency of an input signal, said apparatus comprising:

a phase locked loop adapted to generate a nonsmoothed frequency estimate of a received radio signal; and a filter of frequency estimates comprising a plurality of reactive elements adapted to receive said nonsmoothed estimate and to generate a smoothed frequency estimate of said received radio signal.

19. The apparatus of claim 18 wherein said phase locked loop further comprises:

an oscillator for generating a reference signal;

a phase discriminator adapted to generate an estimate of the difference between a phase of said reference signal and a phase of a received radio frequency signal;

a first instantaneous element connected to at least a first output of said phase discriminator;

a first integrating block connected to said at least a first output of said phase discriminator;

a first adder for adding the output of said first instantaneous element to the output of said first integrating block; and a second adder for adding the output of said first adder to the output of said first instantaneous element.

20. The apparatus of claim 19 wherein said filter of frequency estimates is adapted to selectively receive at least one of the output of said first integrating block or the output of said second adder.

21. The apparatus of claim 20 wherein said filter of frequency estimates comprises:

a difference element;

a second instantaneous element;

a second integrating block;

a third adder; and an accumulator.

22. The apparatus of claim 21 wherein said filter of frequency estimates further comprises:

a first output comprising at least a first output of said accumulator; and a second output comprising at least a first output of said second integrating block.

23. The circuit of claim 21 wherein said filter of frequency estimates further comprises:

a first output comprising at least a first output of said difference element; and a second output comprising at least a first output of said second integrating block.

* * * * *

UNITED STATES PATENT AND TRADEMARK OFFICE
CERTIFICATE OF CORRECTION

PATENT NO. : 7,222,035 B1
APPLICATION NO. : 10/990605
DATED : May 22, 2007
INVENTOR(S) : Mark I. Zhodzishsky et al.

It is certified that error appears in the above-identified patent and that said Letters Patent is hereby corrected as shown below:

Column 6, line 6, " $F_{NCO}{}^{i+1} = \Delta F_{NCO} * f_{NCO}{}^{i+1}$ ", should read -- $F_{NCO}^{i+1} = \Delta F_{NCO} * f_{NCO}^{i+1}$ --.

Column 6, line 10, "unit", should read --unit.--.

Column 6, line 26, " $\Phi_{NCO}{}^{i+1} = \Phi_{NCO}{}^{i} + \Delta\Phi_{NCO} * \varphi_{NCO}{}^{i}$ " should read -- $\Phi_{NCO}^{i+1} = \Phi_{NCO}^{i} + \Delta\Phi_{NCO} * \varphi_{NCO}^{i}$ --.

Column 6, line 30, " $\varphi_{NCO}{}^{i}$ ", should read -- $\varphi_{NCO}^{i}$ --.

Column 7, line 47, " $N_{input}{}^{i}$ ", should read -- $N_{input}^{i}$ --.

Column 7, line 51, " $N_{a_1}{}^{i+2} = N_{input}{}^{i} - N_{\Sigma_f}{}^{i}$ ", should read -- $N_{a_1}^{i+1} = N_{input}^{i} - N_{\Sigma_f}^{i}$ --.

Column 7, line 53, " $N_{\Sigma_1}{}^{i+1} = N_{\Sigma_1}{}^{i} + k_1 * N_{a_1}{}^{i+1}$ ", should read -- $N_{\Sigma_1}^{i+1} = N_{\Sigma_1}^{i} + k_1 * N_{a_1}^{i+1}$ --.

Column 7, line 55, " $N_{IB}{}^{i+1} = N_{\Sigma_1}{}^{i+1}$ ", should read -- $N_{IB}^{i+1} = N_{\Sigma_1}^{i+1}$ --.

Column 7, line 57, " $N_{\Sigma_f}{}^{i+1} = N_{\Sigma_f}{}^{i} + k_f * N_{a_1}{}^{i} + N_{IB}{}^{i+1}$ ", should read -- $N_{\Sigma_f}^{i+1} = N_{\Sigma_f}^{i} + k_f * N_{a_1}^{i} + N_{IB}^{i+1}$ --.

Column 7, line 59, " $N_{a_1}{}^{i}$ ", should read -- $N_{a_1}^{i}$ --.

Column 7, line 60, " $N_{\Sigma_f}{}^{i}$ ", should read -- $N_{\Sigma_f}^{i}$ --.

Column 7, line 61, " $N_{IB}{}^{i}$ ", should read -- $N_{IB}^{i}$ --.

Column 7, line 62, " $N_{\Sigma_1}{}^{i}$ ", should read -- $N_{\Sigma_1}^{i}$ --.

Column 7, line 66, " $N_{\Sigma_1}{}^{i+1} = N_{\Sigma_1}{}^{i} + N_{\Sigma_2}{}^{i+1} + k_1 * N_{a_1}{}^{i+1}$ ", should read -- $N_{E_1}^{i+1} = N_{\Sigma_1}^{i} + N_{\Sigma_2}^{i+1} + k_1 * N_{a_1}^{i+1}$ --.

Column 8, line 1, " $N_{\Sigma_2}{}^{i+1} = N_{\Sigma_2}{}^{i} + k_2 * N_{a_1}{}^{i+1}$ ", should read -- $N_{\Sigma_2}^{i+1} = N_{\Sigma_2}^{i} + k_2 * N_{a_1}^{i+1}$ --.

Column 8, line 22, " $N_{a_1}{}^{i+1} = N_{input}{}^{i} - \left(k_f * N_{\Sigma_f}{}^{i} + N_{IB}{}^{i}\right)$ ", should read -- $N_{a_1}^{i+1} = N_{input}^{i} - \left(k_f * N_{\Sigma_f}^{i} + N_{IB}^{i}\right)$ --.

UNITED STATES PATENT AND TRADEMARK OFFICE
CERTIFICATE OF CORRECTION

PATENT NO. : 7,222,035 B1
APPLICATION NO. : 10/990605
DATED : May 22, 2007
INVENTOR(S) : Mark I. Zhodzishsky et al.

It is certified that error appears in the above-identified patent and that said Letters Patent is hereby corrected as shown below:

Column 8, line 24, "$N_{\Sigma_f}^{i+1} = N_{\Sigma_f}^{i} + N_{a_1}^{i+1}$", should read -- $N_{\Sigma_f}^{i+1} = N_{\Sigma_f}^{i} + N_{a_1}^{i+1}$ --.

Column 8, line 26, "$N_{\Sigma_1}^{i+1} = N_{\Sigma_1}^{i} + k_1 * N_{\Sigma_f}^{i+1}$", should read -- $N_{\Sigma_1}^{i+1} = N_{\Sigma_1}^{i} + k_1 * N_{\Sigma_f}^{i+1}$ --.

Column 8, line 28, "$N_{IB}^{i+1} = N_{\Sigma_f}^{i+1}$", should read -- $N_{IB}^{i+1} = N_{\Sigma_f}^{i+1}$ --.

Column 8, line 30, "10A 10D", should read -- 10 A – 10D --.

Column 8, line 35, "$N_{a_2}^{i} = k_f * N\Sigma_f^{i} + N_{IB}^{i}$", should read -- $N_{a_2}^{i} = k_f * N_{\Sigma_f}^{i} + N_{IB}^{i}$ --.

Column 8, line 40, "$N_{\Sigma_1}^{i+1} = N_{\Sigma_1}^{i} + N_{\Sigma_2}^{i+1} + k_1 * N_{\Sigma_f}^{i+1}$", should read -- $N_{\Sigma_1}^{i+1} = N_{\Sigma_1}^{i} + N_{\Sigma_2}^{i+1} + k_1 * N_{\Sigma_f}^{i+1}$ --.

Column 8, line 43, "$N_{\Sigma_2}^{i+1} = N_{\Sigma_2}^{i} + k_2 * N_{\Sigma_f}^{i+1}$", should read -- $N_{\Sigma_2}^{i+1} = N_{\Sigma_2}^{i} + k_2 * N_{\Sigma_f}^{i+1}$ --.

Signed and Sealed this

Second Day of October, 2007

JON W. DUDAS
*Director of the United States Patent and Trademark Office*